United States Patent
Tokuno et al.

(10) Patent No.: US 6,870,018 B1
(45) Date of Patent: Mar. 22, 2005

(54) VULCANIZABLE FLOUROELASTOMER COMPOSITION

(75) Inventors: Satoshi Tokuno, Settsu (JP); Hideya Saito, Settsu (JP); Tetsuya Higuchi, Settsu (JP); Satoshi Komatsu, Settsu (JP); Satoshi Koyama, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 117 days.

(21) Appl. No.: 10/129,544

(22) PCT Filed: Nov. 7, 2000

(86) PCT No.: PCT/JP00/07815

§ 371 (c)(1),
(2), (4) Date: May 8, 2002

(87) PCT Pub. No.: WO01/34666

PCT Pub. Date: May 17, 2001

(30) Foreign Application Priority Data

Nov. 9, 1999 (JP) .......................................... 11-318385
Aug. 10, 2000 (JP) ....................................... 2000-243196

(51) Int. Cl.$^7$ ................................................. C08F 2/00
(52) U.S. Cl. ...................... 526/210; 526/217; 526/227; 526/253; 526/254; 526/255
(58) Field of Search ................................ 526/253, 254, 526/255, 217, 227, 210

(56) References Cited

U.S. PATENT DOCUMENTS

| 4,123,603 A | 10/1978 | Stewart, Jr. |
| 4,985,520 A | 1/1991 | Hayashi et al. |
| 5,175,223 A | * 12/1992 | Brinati et al. ............... 526/254 |

FOREIGN PATENT DOCUMENTS

| DE | 43 33 584 A | 4/1994 |
| EP | 456019 A1 | 11/1991 |
| EP | 679666 A1 | 11/1995 |
| EP | 0 739 911 A | 10/1996 |
| EP | 930319 A1 | 7/1999 |
| FR | 2 105 255 A | 4/1972 |
| JP | 62-112611 | 5/1987 |

OTHER PUBLICATIONS

Supplementary European Search Report for EP 00 97 1827 dated Mar. 25, 2004.
Marco Apostolo et al., "Emulsion Polymerization of Vinylidene Fluoride and Hexafluoropropylene: Average Number of Active Chains per Particle"; Macromolecular Symposia; Wiley VCH, Weinheim, DE, No. 150, Feb. 2000, pp. 65–71.
International Search Report for PCT/JP00/07815 dated Feb. 6, 2001.
Written Opinion (Japanese language) for PCT/JP00/07815 dated Sep. 4, 2001 from International Preliminary Examination Authority.
International Preliminary Examination Report for PCT/JP00/07815 dated Jul. 21, 2002.
Supplementary Partial European Search Report for EP 00 97 1827 dated Mar. 20, 2003.

* cited by examiner

*Primary Examiner*—William K. Cheung
(74) *Attorney, Agent, or Firm*—Sughrue Mion, PLLC

(57) ABSTRACT

A vulcanizable fluorine-containing elastomer composition having excellent stability in molding and kneading property, from which a vulcanized article having a small compression set can be produced in a short period of time. The vulcanizable fluorine-containing elastomer composition comprises a vulcanization agent, a vulcanization aid and a fluorine-containing elastomer having C—H bond in its polymer chain, and an optimum vulcanization time $T_{90}$ (min) of the composition and a compression set CS (%) of the vulcanized article satisfy the following equations (I) and (II):

Equation (I): in case of $50,000 \leq MW \leq 200,000$, $$CS \leq -3.45 \, Ln(T_{90}) + 22.8 - 4 \times 10^{-5} \times MW$$

Equation (II): in case of $200,000 < MW$, $$CS \leq -3.45 \, Ln(T_{90}) + 14.8.$$

46 Claims, No Drawings

VULCANIZABLE FLOUROELASTOMER COMPOSITION

TECHNICAL FIELD

The present invention relates to a novel fluorine-containing elastomer which has few branched chains and undergoes a small change in its weight at high temperatures (reduced thermal deterioration and evaporation) and relates to a process for preparation of the elastomer. Also, the present invention relates to an elastomer composition which exhibits excellent flowability at processing, can be vulcanized effectively, does not contaminate a metal die, has excellent mold-releasing property and provides a fluorine-containing vulcanized article which possesses a small compression set and excellent mechanical properties.

The vulcanized article of the present invention can be used suitably particularly for diaphragm and sealing materials such as O-ring, oil seal, packing and gasket.

BACKGROUND ART

Vinylidene fluoride (VdF) elastomers comprising various components have been proposed so far. Examples of such a known VdF elastomer are a copolymer of VdF and hexafluoropropylene (HFP) (VdF/HFP=60 to 15/40 to 85 in % by weight) (for example, JP-B-33-7394); a terpolymer of tetrafluoroethylene (TFE), VdF and HFP in which an amount of TFE is from 3 to 35% by weight and a weight ratio of VdF/HFP is from 2.33/1 to 0.667/1 (for example, JP-B-36-3495); a terpolymer of tetrafluoroethylene (TFE), VdF and HFP in which an amount of TFE is from 10 to 30% by weight and a weight ratio of VdF/HFP is from 1.6/1.0 to 4.0/1.0 (for example, JP-B-48-18957); a terpolymer comprising from 57 to 61% by weight of VdF, from 27 to 31% by weight of HFP and from 10 to 14% by weight of TFE (for example, JP-A-53-149291); and the like. Further there was proposed a process for preparing, in the presence of a chain transfer agent, a VdF elastomer comprising VdF and at least one other fluorinated ethylenically to unsaturated monomer having carbon atoms and at least the same number of fluorine atoms (JP-A-47-5944).

However the elastomer of the present invention explained hereinbelow has not been obtained by any of those means. This is because those patent publications take uniformity of a polymer structure into consideration and are silent with respect to setting of reaction conditions directed to a reaction to produce branch chains and thus even concrete means to solve problems are not suggested.

Fluorine-containing elastomers are molded by means of usual rubber processing equipment. Namely, the elastomers are processed in the order of kneading with a kneading roll or kneader, molding with an extruder, calendar roll or press, primary vulcanizing by press injection and then finally secondary vulcanizing with an oven.

However only with the above-mentioned fluorine-containing elastomers, there are problems with mold-processing, namely processability with a roll at kneading and mold-releasing property at compression molding are inferior, contamination of a metal die cannot be fully prevented and flowability at injection molding is not good. Therefore in order to solve those problems with mold-processing, widening of a molecular weight distribution has been proposed (for example, JP-A-52-62391, JP-A-4-209643, etc.).

On the contrary, there arose a tendency that by increasing a content of low molecular weight components, resistance against compression set was lowered, and mechanical strength such as elongation and tensile strength and further solvent resistance were lowered.

As mentioned above, physical properties such as resistance against compression set and mechanical properties are considered contrary to mold-processability. Actually in order to take a balance of physical properties and mold-processability, a molecular weight and a molecular weight distribution of a polymer are adjusted, a structure of the polymer end is changed or any of properties are sacrificed depending on applications.

Further with respect to the fluorine-containing elastomer composition for a sealing material such as O-ring and gasket, a particularly low compression set and further an efficient vulcanization (high vulcanization rate and high crosslinking density) are required. Compression set is an important factor for evaluating a sealing performance, and if the compression set is high, sealing performance is lost in a short period of time. Vulcanizability is a factor greatly influencing productivity in mold-processing, and it is desired that the vulcanizability is as high as possible within the range satisfying required physical properties. Also particularly in injection molding, an excellent flowability is required. If the flowability is inferior, pouring into a metal die is difficult and a molding material must be used in an amount more than required. Also there is a case where a thickness of a molded article becomes non-uniform.

In order to make vulcanization efficient, there is proposed that the number of ionic ends (or acid ends) attributable to ammonium persulfate which has been used as a polymerization initiator is minimized as low as possible. For example, there are a method of using an oil soluble organic peroxide as a polymerization initiator (for example, JP-A-6-302487, JP-A-8-301940) and a method of using a fluoroalkyl sulfinate and organic peroxide together (U.S. Pat. No. 5,256,745). However in those methods, processability other than vulcanizability cannot be satisfied.

To enhance the both of vulcanization efficiency and resistance against compression set simultaneously, there is proposed a method of adding a phosphonate compound or the like as a vulcanization accelerator (JP-A-62-54750). However even in this method, there remains a problem that enhancement of processability cannot be attained.

Further though the flowability is intended to be improved by decreasing a molecular weight as mentioned above, resistance against compression set and vulcanization efficiency are still insufficient.

JP-A-10-130447 discloses a technique that by vulcanizing in an oven for 0 to 30 minutes, a compression set becomes not more than 20%, a thermal stability is high and a content of a low molecular weight component having a molecular weight of not more than 10,000 is small. However according to concrete preparation examples of the publication, even if the vulcanization in an oven is carried out for not less than 30 minutes, compression set does not change as compared with that of 30-minute vulcanization in an oven and is only about 14%. Namely, reduction of a content of a low molecular weight component is not made sufficiently and is still insufficient from the viewpoint of recent market demand.

An object of the present invention is to provide a novel fluorine-containing elastomer which has few branched chains and undergoes a small change in its weight at high temperatures (reduced thermal deterioration and evaporation) and to provide a process for preparation of the elastomer.

Another object of the present invention is to provide a fluorine-containing elastomer composition which has a high vulcanization efficiency and excellent mold-processability and provides a vulcanized article which undergoes a small compression set.

DISCLOSURE OF INVENTION

Namely, the present invention relates to a fluorine-containing elastomer comprising vinylidene fluoride (VdF) unit and hexafluoropropylene (HFP) unit and characterized in that:

(1) when a 0.2% by weight acetone solution of the fluorine-containing elastomer is subjected to pressurized filtration under a condition where acetone passes through at a flow rate $F_0$ of 2.4 g/min·cm$^2$, a ratio $F_0/F_1$ is from 1.2 to 3.5, preferably from 1.2 to 3.0, provided that $F_1$ is an amount of filtrate of the acetone solution during initial one minute, and (2) a weight average molecular weight MW measured by GPC is from 50,000 to 600,000.

Preferably the above-mentioned fluorine-containing elastomer is further characterized in that:

(3) a ratio of an average molecular weight $MW_{LS}$ measured by GPC-LALLS to $MW_{RI}$ measured by GPC-RI, namely a ratio $MW_{LS}/MW_{RI}$ is from 1 to 2.5.

The present invention relates to a fluorine-containing elastomer which comprises VdF unit and HFP unit and is characterized in that a weight average molecular weight MW measured by GPC is from 50,000 to 600,000, and when the elastomer is vulcanized in the following standard formulation under the following standard vulcanization conditions, an optimum vulcanization time $T_{90}$ (min) and a compression set CS (%) satisfy the following equations (I) and (II):

Equation (I): in case of $50,000 \leq MW \leq 200,000$, $$CS \leq -3.45\ \mathrm{Ln}(T_{90}) + 22.8 - 4 \times 10^{-5} \times MW$$

Equation (II): in case of $200,000 < MW$, $$CS \leq -3.45\ \mathrm{Ln}(T_{90}) + 14.8.$$

Standard Formulation 100 parts by weight of a fluorine-containing elastomer, 2.2 parts by weight of bisphenol AF, 0.4 part by weight of benzyltriphenylphosphonium chloride, 3 parts by weight of a highly activated magnesium oxide, 20 parts by weight of a carbon black MT-C and 6 parts by weight of calcium hydroxide.

Standard Vulcanization Conditions

Kneading method: Kneading by roll
Press vulcanization: 170° C. for 10 minutes
Vulcanization in an oven: 230° C. for 24 hours.

It is preferable that the fluorine-containing elastomer comprises 50 to 90% by mole of VdF unit and 50 to 10% by mole of HFP unit and contains ionic end groups in an amount of from $10^{-5}$ to $10^{-2}$ moles per 1 kg of the elastomer and further a weight reduction ratio of the elastomer when heated at 250° C. for 48 hours is not more than 1% by weight.

It is preferable that the fluorine-containing elastomer satisfies the following equation (IV):

$$Y \leq -5.3\ \mathrm{Ln}(X) + 28,$$

provided that X is a Mooney viscosity (1+10) at 100° C. and Y is a percent by weight of a low molecular weight component having a weight average molecular weight measured by GPC of not more than 30,000 in the fluorine-containing elastomer.

The present invention also relates to a vulcanizable fluorine-containing elastomer composition which comprises a vulcanization agent, a vulcanization aid and a fluorine-containing elastomer having C—H bond in its polymer chain and characterized in that:

(1) when a 0.2% by weight acetone solution of the fluorine-containing elastomer is subjected to pressurized filtration under a condition where acetone passes through at a flow rate $F_0$ of 2.4 g/min·cm$^2$, a ratio $F_0/F_1$ is from 1.2 to 3.5, provided that $F_1$ is an amount of filtrate of the acetone solution during initial one minute, and (2) a weight average molecular weight MW measured by GPC is from 50,000 to 600,000.

Preferably the above-mentioned fluorine-containing elastomer is further characterized in that:

(3) a ratio of an average molecular weight $MW_{LS}$ measured by GPC-LALLS to $MW_{RI}$ measured by GPC-RI, namely a ratio $MW_{LS}/MW_{RI}$ is from 1 to 2.5.

The present invention relates to a vulcanizable fluorine-containing elastomer composition which comprises a vulcanization agent, a vulcanization aid and a fluorine-containing elastomer having C—H bond in its polymer chain and characterized in that a weight average molecular weight MW measured by GPC of the elastomer is from 50,000 to 600,000 and when the elastomer is vulcanized in the above-mentioned standard formulation under the above-mentioned standard vulcanization conditions, an optimum vulcanization time $T_{90}$ (min) and compression set CS (%) thereof satisfy the following equations (I) and (II):

Equation (I): in case of $50,000 \leq MW \leq 200,000$, $$CS \leq -3.45\ \mathrm{Ln}(T_{90}) + 22.8 - 4 \times 10^{-5} \times MW$$

Equation (II): in case of $200,000 < MW$, $$CS \leq -3.45\ \mathrm{Ln}(T_{90}) + 14.8.$$

Further the present invention relates to a vulcanizable fluorine-containing elastomer composition which comprises a vulcanization agent, a vulcanization aid and a fluorine-containing elastomer having C—H bond in its polymer chain and is characterized in that an optimum vulcanization time $T_{90}$ (min) of the composition and a compression set CS (%) of a vulcanized article satisfy the following equations (I) and (II):

Equation (I): in case of $50,000 \leq MW \leq 200,000$, $$CS \leq -3.45\ \mathrm{Ln}(T_{90}) + 22.8 - 4 \times 10^{-5} \times MW$$

Equation (II): in case of $200,000 < MW$, $$CS \leq -3.45\ \mathrm{Ln}(T_{90}) + 14.8.$$

In those compositions, it is preferable that a copolymer of vinylidene fluoride and other monomer is used as the fluorine-containing elastomer and at least one selected from the group consisting of hexafluoropropylene, tetrafluoroethylene and perfluoro(alkyl vinyl ether) is used as the other monomer.

Example of the vulcanization agent is preferably at least one selected from the group consisting of polyhydroxy compounds, polyamine compounds and organic peroxides. Further example of the polyhydroxy compound is preferably at least one selected from the group consisting of bisphenol AF, hydroquinone, bisphenol A and diaminobisphenol AF. Example of the organic peroxide is preferably at least one selected from the group consisting of α,α'-bis(t-butylperoxy)diisopropylbenzene, 2,5-dimethyl-2,5-di(t-butylperoxy)hexane and dicumyl peroxide. Examples of the polyamine compound are preferably hexamethylenediamine carbamate and/or N,N'-dicinnamylidene-1,6-hexamethylenediamine.

The suitable vulcanization aid is at least one organic base residue selected from the group consisting of quaternary ammonium salts, quaternary phosphonium salts, cyclic amines and mono-functional amine compounds.

The present invention further relates to a process for preparing a fluorine-containing elastomer having C—H bond in its polymer chain by emulsion-polymerizing polymerizable monomers in an aqueous medium in a reactor, in which the polymerization is carried out under the conditions that:
(a) a reaction system in the reactor has a gas phase and a liquid phase, and
(b) during the polymerization reaction, a content Cp of the polymerizable monomers in the polymer particles which are in the process of polymerization reaction is maintained at a reference content $C_1$ or more of the polymerizable monomers in the polymer particles in which the reference content $C_1$ is defined as follows.

A pressure resistant reactor is charged with pure water and polymer particles having the same components and proportion as an intended polymer in an amount of 1% by weight based on water and then the gas phase is replaced with nitrogen gas. After introducing a polymerizable monomer or a monomer mixture corresponding to intended components and proportion under pressure into the gas phase in a concentration of 1.0 mole/liter (the concentration is a value obtained by dividing the total number of moles of the introduced monomer by a volume inside the reactor excluding a volume of the liquid phase), the liquid phase is stirred sufficiently while maintaining the inside of the reactor at a given reaction temperature. A content of the polymerizable monomers in the polymer particles when a content of the polymerizable monomers in the liquid phase and the polymer particles comes to equilibrium is defined as the reference content $C_1$ of the polymerizable monomers in the polymer particles.

It is particularly preferable that the content Cp of the polymerizable monomers in the polymer particles which are in the process of polymerization reaction is maintained at a reference content $C_2$ or more of the polymerizable monomers in the polymer particles in which the reference content $C_2$ is defined as follows.

A pressure resistant reactor is charged with pure water and polymer particles having the same components and proportion as an intended polymer in an amount of 1% by weight based on water and the gas phase is replaced with nitrogen gas. After introducing a polymerizable monomer or a monomer mixture corresponding to intended components and proportion under pressure into the gas phase in a concentration of 2.0 mole/liter (the concentration is a value obtained by dividing the total number of moles of the introduced monomer by a volume inside the reactor excluding a volume of the liquid phase), the liquid phase is stirred sufficiently while maintaining the inside of the reactor at a given reaction temperature. A content of the polymerization monomers in the polymer particles when a content of the polymerizable monomers in the liquid phase and the polymer particles comes to equilibrium is defined as the reference content $C_2$ of the polymerizable monomers in the polymer particles.

The polymerizable monomer may be introduced into the reactor continuously or batchwise. A water soluble radical polymerization initiator is suitable as the polymerization initiator.

The polymerizable monomer which can be used on the above-mentioned process is not limited particularly, and the use of vinylidene fluoride and other monomer is advantageous. It is preferable that the other monomer is at least one selected from the group consisting of hexafluoropropylene, tetrafluoroethylene and perfluoro(alkyl vinyl ether).

BEST MODE FOR CARRYING OUT THE INVENTION

First, the fluorine-containing elastomer composition having a high vulcanization efficiency and excellent mold-processability and providing a vulcanized article having a small compression set is explained below.

The fluorine-containing elastomer composition is a vulcanizable fluorine-containing elastomer composition which comprises a vulcanization agent, a vulcanization aid and the fluorine-containing elastomer having C—H bond in its polymer chain and is characterized in that an optimum vulcanization time $T_{90}$ (min) of the composition and a compression set CS (%) of a vulcanized article satisfy the following equations (I) and (II):

Equation (I): in case of $50,000 \leq MW \leq 200,000$, $$CS \leq -3.45 \; Ln(T_{90}) + 22.84 \times 10^{-5} \times MW$$

Equation (II): in case of $200,000 < MW$, $$CS \leq -3.45 \; Ln(T_{90}) + 14.8.$$

Those equations represent a proper relation between vulcanizing time and compression set and indicate that particularly when the MW is not more than 200,000, the compression set is influenced also by the MW. On the other hand, the equations indicate that the compression set CS (%) of a vulcanized article obtained from the fluorine-containing elastomer composition of the present invention is small as compared with other elastomer even in case of the same optimum vulcanization time $T_{90}$ (min) and weight average molecular weight. The composition satisfying those equations has good vulcanizability and processability and provides a vulcanized article having a small compression set.

As the molecular weight increases, the compression set tends to be lowered. Therefore when the weight average molecular weight is not less than 300,000, it is further preferable that the fluorine-containing elastomer composition satisfies the following equation (III).

$$CS \leq -3.45 \; Ln(T_{90}) + 13.3$$

Examples of the fluorine-containing elastomer having C—H bond in its polymer chain are, for instance, a copolymer comprising vinylidene fluoride (VdF) unit and other monomer unit, a copolymer comprising ethylene unit and other fluorine-containing monomer unit, and the like.

Then explained below are monomer components of the VdF elastomer which are particularly suitable for the composition of the present invention.

It is preferable that the other fluorine-containing monomer which is copolymerized with VdF is a monomer selected from the group consisting of perfluoro olefins and perfluoro (vinyl ethers).

Examples of the perfluoro olefin are, for instance, monomers represented by the formula (I):

$$CF_2=CF-Rf^1 \tag{I}$$

wherein $Rf^1$ is fluorine atom or a perfluoroalkyl group having 1 to 9 carbon atoms. Examples thereof are TFE, HFP, and the like.

Examples of the perfluoro(vinyl ether) are, for instance, perfluoro(alkyl vinyl ether) (PAVE) represented by the formula (II)

$$CF_2=CF-O-Rf^2 \quad (II)$$

wherein $Rf^2$ is a perfluoroalkyl group having 1 to 5 carbon atoms and perfluoro(alkoxy vinyl ether) represented by the formula (III):

$$CF_2=CF-O-(CF_2CFXO)_m-Rf^2 \quad (III)$$

wherein $Rf^2$ is as defined above, X is fluorine atom or $CF_3$, m is an integer of from 1 to 6.

Examples of the PAVE of the formula (II) are, for instance, perfluoro(methyl vinyl ether) (PMVE), perfluoro (ethyl vinyl ether) (PEVE), perfluoro(propyl vinyl ether) (PPVE), and the like.

Examples of the perfluoro(alkoxy vinyl ether) of the formula (III) are, for instance, $CF_2=CF-O-(CF_2CF(CF_3)O)_2-CF_2CF_2CF_3$, and the like.

In the monomers of the formulae (I) to (III), any of fluorine atoms at ends of $Rf^1$ and $Rf^2$ may be carboxyl group, sulfonic acid group, hydroxyl group or a group derived therefrom.

The VdF elastomers which can be preferably used for the composition of the present invention are roughly classified into copolymers and terpolymers. It is a matter of course that the novel fluorine-containing elastomer explained hereinbelow can be used suitably.

In case of the copolymer, a copolymer of VdF and HFP, a copolymer of VdF and CTFE and a copolymer of VdF and PAVE are preferred. Particularly preferred is the copolymer of VdF and HFP in a mole ratio of from 9/1 to 5/5, further preferably from 8.5/1.5 to 6/4.

In case of the terpolymer, a terpolymer of VdF, HFP and TFE and a terpolymer of VdF, TFE and perfluoro(vinyl ether) are preferred. Particularly preferred are the VdF/HFP/TFE terpolymer in which a mole ratio of VdF/HFP is from 8.5/1.5 to 6/4 and an amount of TFE is from 10 to 30% by mole and the VdF/TFE/perfluoro(vinyl ether) terpolymer in which an amount of perfluoro(vinyl ether) unit is from 10 to 50% by mole, further preferably from 30 to 50% by mole and a mole ratio of VdF/TFE is from 1/9 to 9/1. Preferred perfluoro(vinyl ether) is PAVE.

It is preferable that the fluorine-containing elastomer having C—H bond in its polymer chain is prepared, for example, by the process mentioned below since the elastomer having few branched chains and excellent vulcanizability and processability can be obtained.

Namely, the polymerization is carried out by the process for preparing the fluorine-containing elastomer having C—H bond in its polymer chain by emulsion-polymerizing polymerizable monomers in an aqueous medium in a reactor under the conditions that:

(a) a reaction system in the reactor has a gas phase and a liquid phase, and (b) during the polymerization reaction, the content Cp of the polymerizable monomers in the polymer particles which are in the process of polymerization reaction is maintained at the reference content $C_1$ or more or the reference content $C_2$ or more of the polymerizable monomer in the polymer particles which was defined above.

The reference content $C_1$ of the polymerizable monomers in the polymer particles means a content of monomers in the polymer particles in an equilibrium state between the gas phase, liquid phase and polymer particles in case where the monomer content in the gas phase is 1.0 mole/liter. The reference content $C_1$ is a minimum reference content inhibiting formation of branched or gelled polymer to an extent not affecting the physical properties of the elastomer such as compression set (CS).

The reference content $C_2$ of the polymerizable monomer in the polymer particles means a content of monomers in the polymer particles in an equilibrium state between the gas phase, liquid phase and polymer particles in case where the monomer content in the gas phase is 2.0 mole/liter. The reference content $C_2$ is a minimum reference content inhibiting formation of branched or gelled polymer to an extent not affecting the physical properties of the elastomer such as compression set (CS).

As mentioned above, the polymerizable monomer content in the gas phase is a value obtained by dividing the total number of moles of the introduced monomers by a volume inside the reactor excluding a volume of the liquid phase and contains the liquefied monomer as far as it is not present in the liquid phase and in the polymer particles.

The preparation process is concretely explained below.

Since the polymerization is carried out usually under pressure, the pressure resistant reactor is used. An aqueous medium (usually pure water) containing polymer particles for emulsion polymerization comprising the same components and proportion as an intended polymer is put in the reaction tank to form a liquid phase. The inside of the reaction tank comprises this liquid phase and a gas phase. After the gas phase is replaced with nitrogen gas, a polymerizable monomer is introduced. Then the inside of the reaction tank, particularly the liquid phase is subjected to stirring to supply the polymerizable monomer from the gas phase to the liquid phase. With the monomer supplied to the liquid phase the polymer particles are impregnated and thus a polymerizable monomer content in the polymer particles is increased. When supplying of the monomer to the gas phase is continued, since the monomer content in the polymer particles is saturated (it can be said that a rate of supplying the monomer to the liquid phase comes to an equilibrium), a polymerization initiator is introduced to start polymerization.

As the polymerization is continued, the monomer is consumed and a monomer content in the produced polymer particles (called "Cp" in the present invention) is decreased. A feature of the preparation process of the present invention is to maintain this monomer content Cp in the produced polymer particles at the reference monomer content $C_1$ or more in the polymer particles. Namely, the polymerization is carried out under the condition that the monomer can be continuously supplied to the polymer at a high monomer content. When the polymerization is carried out under that condition, a uniform polymerization reaction and a high polymerization rate can be obtained. Even if this condition is discontinued for a short period of time, there arises no problem as far as the polymerization reaction is carried out substantially uniformly.

The reference monomer contents $C_1$ and $C_2$ are the monomer contents in the polymer particles and cannot be measured directly. As a factor relating to the monomer content in the polymer particles, there is a polymerization rate which can be calculated from actually measurable figures.

For example, a polymerization rate $K_1$ in the polymer particles (hereinafter referred to as "reference polymerization rate" in a polymerization system maintained at the reference monomer content $C_1$ becomes 0.07 kg/liter·hr under the following polymerization conditions.

(Polymerization Conditions)
Content of monomer mixture in gas phase: 1 mole/liter
Monomer components in gas phase: VdF/HFP=45/55% by mole
Polymerization temperature: 80° C.
Content of polymerization initiator (APS): 300 ppm (based on water)
Content of molecular weight controller (diethyl malonate): 900 ppm (based on water)
Number of seed particles: $3 \times 10^{14}$ per 1 ml of water
Content of emulsifying agent (ammonium perfluorooctanoate): 2,000 ppm (based on water)
Components of monomer mixture added continuously: VdF/HFP=78/22% by mole
Polymerization time: 120 minutes.

Also a reference polymerization rate $K_2$ in the polymer particles in a polymerization system maintained at the reference monomer content $C_2$ becomes 0.17 kg/liter-hr under the following polymerization conditions.
(Polymerization Conditions)
Content of monomer mixture in gas phase: 2 mole/liter
Monomer components in gas phase: VdF/HFP-43/57% by mole
Polymerization temperature: 80° C.
Content of polymerization initiator (APS): 300 ppm (based on water)
Content of molecular weight controller (diethyl malonate): 2,100 ppm (based on water)
Number of seed particles: $3 \times 10^{14}$ per 1 ml of water
Content of emulsifying agent (ammonium perfluorooctanoate): 2,000 ppm (based on water)
Components of monomer mixture added continuously: VdF/HFP=78/22% by mole
Polymerization time: 240 minutes.

For maintaining the monomer content Cp in produced polymer particles at not less than the reference monomer content $C_1$ in the polymer particles at starting the polymerization, there are a method of sufficiently stirring the liquid phase to take the monomer from the gas phase, a method of increasing the monomer content in the gas phase (increasing a pressure of the gas phase) to forcedly supply the monomer to the liquid phase, a method of combining those methods, and the like.

When the volume of the gas phase is sufficiently present in the system, an area of an interface with the liquid phase increases and supplying of the monomer to the liquid phase and further to the polymer particles can be conducted effectively.

In the preparation process of the present invention, a method of combining the stirring and the increasing of a monomer content (pressure) in the gas phase is preferred. This is because by that method, the monomer content Cp in the polymer particles can be maintained high throughout the polymerization. As mentioned above, it is preferable to maintain the monomer content of the gas phase during the polymerization at not less than 1.0 mole/liter, preferably not less than 1.5 mole/liter, particularly preferably not less than 2.0 mole/liter.

As the means for stirring, there can be used, for example, an anchor blade, turbine blade, inclined blade, etc. From the viewpoint of good monomer diffusion and dispersion stability of the monomer, the stirring with a large size blade called FULLZONE or MAXBLEND is preferred. With respect to a stirring equipment, either of horizontal stirrer or vertical stirrer may be employed. From the viewpoint of easy diffusion of the monomer, the horizontal stirrer is preferred.

The polymerization temperature is not limited particularly and an optimum polymerization temperature is selected depending on kind of the polymerization initiator. However if the polymerization temperature is too high, there is a case where the monomer density in the gas phase is easily lowered, a reaction for producing branch chains of the polymer arises and an intended polymer cannot be obtained. A preferable polymerization temperature is from 40 to 120° C., more preferably from 50° to 100° C.

The monomer may be supplied continuously or batchwise.

In the preparation process of the present invention, oil soluble peroxides can also be used as the polymerization initiator. However there are problems that the peroxides such as di-isopropylperoxydicarbonate (IPP) and di-n-propylperoxydicarbonate (NPP) which are representative oil soluble polymerization initiators involve a danger of explosion, are expensive and easily cause cohesion of a scale on the wall of the tank during the polymerization. In the present invention, in order to further decrease a compression set, it is preferable to use a water soluble polymerization initiator. Examples of the preferable water soluble polymerization initiator are, for instance, ammonium salt, potassium salt and sodium salt of persulfuric acid, perboric acid, perchloric acid, perphosphoric acid and percarbonic acid. Particularly preferred are ammonium persulfate and potassium persulfate.

An adding amount of the polymerization initiator is not limited particularly. An amount not lowering the polymerization rate remarkably (for example, several ppm based on water) or more may be added once at the initial stage of the polymerization, intermittently or continuously. An upper limit of the adding amount is in the range in which a polymerization reaction heat can be eliminated from the surface of the reactor.

In the preparation process of the present invention, an emulsifying agent and a molecular weight controller may be added. The molecular weight controller may be added once at the initial stage of the polymerization, continuously or dividedly.

As the emulsifying agent, a nonionic surfactant, an anionic surfactant or a cationic surfactant can be used. Particularly fluorine-containing nonionic surfactants, for example, ammonium perfluorooctanoate are preferred. An adding amount thereof (based on water as a polymerization medium) is preferably from 500 to 5,000 ppm.

Examples of the molecular weight controller are, for instance, esters such as dimethyl malonate, diethyl malonate, methyl acetate, ethyl acetate, butyl acetate and dimethyl succinate and in addition, isopentane, isopropanol, acetone, various mercaptans, carbon tetrachloride, cyclohexane, monoiodomethane, 1-iodomethane, 1-iodo-n-propane, isopropyl iodide, diiodomethane, 1,2-diiodomethane, 1,3-diiodo-n-propane, and the like.

In addition, a buffering agent, or the like may be added optionally in an amount not lowering the effect of the present invention.

The vulcanizable fluorine-containing elastomer composition of the present invention comprises the fluorine-containing elastomer, vulcanization agent and vulcanization aid.

The vulcanization agent which can be used in the present invention may be optionally selected depending on an adopted vulcanization system. As the vulcanization system, there can be used any of a polyamine vulcanization system, polyol vulcanization system and peroxide vulcanization system. The effect of the present invention can be remarkably exhibited particularly when the vulcanization is carried out by the polyol vulcanization system.

Non-restricted examples of the vulcanization agent are, for instance, polyhydroxy compounds such as bisphenol AF, hydroquinone, bisphenol A and diaminobisphenol AF in the polyol vulcanization system; for instance, organic peroxides such as α-α'-bis(t-butylperoxy)diisopropylbenzene, 2,5-dimethyl-2,5-di(t-butylperoxy)hexane and dicumyl peroxide in the peroxide vulcanization system; and, for instance, polyamine compounds such as hexamethylenediamine carbamate and N,N'-dicinnamylidene-1,6-hexamethylenediamine in the polyamine vulcanization system.

An adding amount of the vulcanization agent is from 0.01 to 10 parts by weight, preferably from 0.1 to 5 parts by weight based on 100 parts by weight of the elastomer.

As the vulcanization aid, there can be used organic base residues which are usually used for the vulcanization of elastomer, such as various quaternary ammonium salts, quaternary phosphonium salts, cyclic amines and mono-functional amine compounds. Examples thereof are, for instance, quaternary ammonium salts such as tetrabutylammonium bromide, tetrabutylammonium chloride, benzyltributylammonium chloride, benzyltriethylammonium chloride, tetrabutylammoniumhydrogen sulfate and tetrabutylammonium hydroxide; quaternary phosphonium salts such as benzyltriphenylphosphonium chloride, tributylallylphosphonium chloride, tributyl-2-methoxypropylphosphonium chloride and benzylphenyl(dimethylamino)phosphonium chloride; mono-functional amines such as benzylmethylamine and benzylethanolamine; cyclic amines such as 1,8-diazabicyclo[5.4.0]-undec-7-ene; and the like.

An adding amount of the vulcanization aid is from 0.01 to 10 parts by weight, preferably from 0.1 to 5.0 parts by weight based on 100 parts by weight of the elastomer.

Further there may be used usual additives such as a filler, processing aid, carbon black, inorganic filler, metal oxide such as magnesium oxide and metal hydroxide such as calcium hydroxide so far as the object of the present invention is not impaired.

The composition of the present invention is one satisfying the above-mentioned equations (I), (II) and as the case demands, (III). As far as those conditions are satisfied, the preparation process and vulcanization method are not limited particularly, and usual processes and methods can be used.

Then the novel fluorine-containing elastomer of the present invention is explained below.

The novel fluorine-containing elastomer of the present invention comprises VdF unit and HFP unit and is specified by the definition (A), that is:

(1) when a 0.2% by weight acetone solution of the fluorine-containing elastomer is subjected to pressurized filtration under a condition where acetone passes through at a flow rate $F_0$ of 2.4 g/min·cm$^2$, a ratio $F_0/F_1$ is from 1.2 to 3.5, provided that $F_1$ is an amount of filtrate of the acetone solution during initial one minute, and (2) a weight average molecular weight MW measured by GPC is from 50,000 to 600,000.

In the above-mentioned characteristic (1), the filtration amount ratio of acetone solution (namely, a ratio $F_0/F_1$ provided that a 0.2% by weight acetone solution of the fluorine-containing elastomer is subjected to pressurized filtration under a condition where acetone passes through at a flow rate $F_0$ of 2.4 g/min-cm$^2$ and $F_1$ is an amount of filtrate of the acetone solution during initial one minute) is an index indicating a degree of gelling of the fluorine-containing elastomer (hereinafter referred to as "gelling degree"). The smaller the gelling degree is (namely, approximate to the flow (2.4 g/min·cm$^2$) of acetone alone), the less the gelled molecules are. A gelling degree of known VdF elastomer is usually larger than 3.5. In the present invention, the gelling degree is preferably from 1.2 to 3.5 (actual amount of filtrate is from about 2 g/min·cm to about 0.7 g/min·cm$^2$), particularly preferably from 1.2 to 3.0.

In the above-mentioned characteristic (2), the weight average molecular weight MW measured by GPC is in the range capable of maintaining the characteristics of the elastomer, and a proper range is from 50,000 to 600,000, preferably from 100,000 to 500,000.

In the novel fluorine-containing elastomer of the present invention, it is further preferable that (3) a ratio of an average molecular weight $MW_{LS}$ measured by GPC-LALLS to $MW_{RI}$ measured by GPC-RI, namely a ratio $MW_{LS}/MW_{RI}$ is from 1 to 2.5.

In the above (3), the ratio $MW_{LS}/MW_{RI}$ of the average molecular weight $MW_{LS}$ measured by GPC-LALLS to $MW_{RI}$ measured by GPC-RI is an index indicating a degree of branching of the molecule of the copolymer (hereinafter referred to as "branching coefficient"). When the ratio is 1, it is defined that there is no branched chain substantially. The higher the ratio is, the more the number of branched chains increases. The fluorine-containing elastomer of the present invention has a low branching coefficient of from 1 to 2.5, which indicates that there are many linear molecules. In the present invention it is particularly preferable that the branching coefficient is from 1 to 1.5. The methods of measuring the average molecular weight $MW_{LS}$ with GPC-LALLS and the average molecular weight $MW_{RI}$ with GPC-RI in the above (3) and the method of measuring the weight average molecular weight MW with GPC in the above (2) are explained hereinbelow.

The novel fluorine-containing elastomer of the present invention is a fluorine-containing elastomer comprising VdF unit and HFP unit and having a weight average molecular weight MW measured by GPC of from 50,000 to 600,000 and is specified by the definition (B) that when the elastomer is vulcanized in the above-mentioned standard formulation under the above-mentioned standard vulcanization conditions, an optimum vulcanization time $T_{90}$ (min) and a compression set CS (%) satisfy the following equations (I) and (II):

Equation (I): in case of $50,000 \leq MW \leq 200,000$, $$CS \leq -3.45\ \text{Ln}(T_{90}) + 22.8 - 4 \times 10^{-5} \times MW$$

Equation (II): in case of $200,000 < MW$, $$CS \leq -3.45\ \text{Ln}(T_{90}) + 14.8.$$

Those equations are the same as those used for specifying the above-mentioned fluorine-containing elastomer composition. In case of the above-mentioned invention of the composition, the equations make to sense in that the vulcanizable composition itself is specified. However in this novel fluorine-containing elastomer, the elastomer itself is specified by the equations, and the standard formulation and standard vulcanization conditions are specified since physical properties of the elastomer as a novel compound need to be specified. The above-mentioned standard formulation and standard vulcanization conditions are usually used as formulation and vulcanization conditions of elastomers.

As the molecular weight increases, the compression set tends to be lowered. Therefore when the weight average molecular weight is not less than 300,000, it is further preferable that the fluorine-containing elastomer composition satisfies the following equation (III).

$$CS \leq -3.45 \, Ln(T_{90}) + 13.3$$

The novel fluorine-containing elastomer (A) specified by the definition (A) and the novel fluorine-containing elastomer (B) specified by the definition (B) encompass some duplicates, but there are elastomers which can be specified only by either of the definitions.

From the viewpoint of decreasing the compression set, it is particularly preferable that those fluorine-containing elastomers satisfy the following equation (IV):

$$Y \leq -5.3 \, Ln(X) + 28,$$

provided that X is a Mooney viscosity (1+10) at 100° C. and Y is a percent by weight of a low molecular weight component having a weight average molecular weight measured by GPC of not more than 30,000 in the fluorine-containing elastomer.

The Mooney viscosity (1+10) at 100° C. is usually used as an index for mold-processability. The Mooney viscosity in the range of from 20 to 150 is usually considered allowable from the viewpoint of processability. However even if the Mooney viscosity is within the above-mentioned range, when the low molecular weight component is contained in much amount, the compression set of the obtained vulcanized article increases. Most of known fluorine-containing elastomers do not satisfy the above-mentioned equation (IV), and also even if the equation (IV) is satisfied, there are no elastomers satisfying the above-mentioned characteristics (1) to (3) and the equations (I) and (II) simultaneously.

Further it is preferable that a weight reduction ratio of the fluorine-containing elastomer of the present invention when heating at 250° C. for 48 hours is not more than 1% by weight. If the weight reduction ratio is high, there is a case where thermal cracking arises at heating for molding and evaporation of a low molecular weight component occurs, thereby lowering quality of a molded article. A weight reduction ratio of known VdF elastomer usually exceeds 1% by weight, and therefore very small voids are produced inside the elastomer during the vulcanization, which causes lowering of physical properties in normal state of the obtained vulcanized article. Therefore in the present invention, it is preferable that the weight reduction ratio is as low as possible, particularly not more than 0.35% by weight. When the weight reduction ratio is low, a molding temperature and vulcanization temperature can be made higher and there is a case where a secondary vulcanization step can be omitted, which can enhance productivity significantly.

Those characteristics that any of branching coefficient, gelling degree and weight reduction ratio are small indicate that the fluorine-containing elastomer of the present invention does not form a gel, a content of a low molecular weight component is low, the number of branches are small and the molecules have a uniform structure.

Also as mentioned above, in conventional VdF elastomers, stabilization of unstable end groups is carried out because if unstable groups (ionic groups, etc.) are present in the molecular end, vulcanizability and mechanical properties are lowered. However in the fluorine-containing elastomer of the present invention having the above-mentioned characteristics, it was found that unexpectedly the presence of unstable end groups does not influence the mechanical properties of the elastomer at all and does not have any special effect on vulcanization characteristics and on the contrary, the compression set tends to be lowered. Therefore it becomes possible to increase an amount of the polymerization initiator which causes generation of unstable end groups, and productivity of the fluorine-containing elastomer can be enhanced. Further introduction of ionic groups by positively reacting acid components may be carried out from the viewpoint of decreasing the compression set. From this point of view, it is preferable that the novel fluorine-containing elastomer of the present invention contains from $10^{-5}$ to $10^{-2}$ mole, preferably from $10^{-4}$ to $10^{-3}$ mole of ionic end groups per 1 kg of the elastomer.

It is preferable that the fluorine-containing elastomers (A) and (B) contain from 50 to 90% by mole of VdF unit and 50 to 10% by mole of HFP unit, particularly preferably from 65 to 85% by mole of VdF unit and 35 to 15% by mole of HFP unit.

The present invention further relates to the vulcanizable fluorine-containing elastomer composition comprising the above-mentioned novel fluorine-containing elastomer (A) or (B), a vulcanizing agent and a vulcanization aid. The vulcanizable fluorine-containing elastomer composition itself comprising the above-mentioned novel fluorine-containing elastomer (A) or (B), a vulcanizing agent and a vulcanization aid is not restricted by the above-mentioned equations (1) and (U). As the vulcanizing agent and vulcanization aid, those mentioned above can be used.

The fluorine-containing elastomer composition and vulcanized article of the present invention have the following vulcanization characteristics, mold-processability, mechanical properties and compression set. Measuring methods thereof are explained hereinbelow.

[VdF Copolymer]
Vulcanization Characteristics (170° C.)
    Minimum viscosity (ML): 0.098 to 2.94 (N)
    Maximum viscosity (MH): 24.5 to 58.8 (N)
    Induction time ($T_{10}$): 1.0 to 4.0 (min)
    Optimum vulcanization time ($T_{90}$): 2.0 to 5.0 (min).
Mold-Processability
    Contamination of a mold die does not occur and processability with a roll is excellent.
[VdF Terpolymer]
Vulcanization Characteristics (170° C.)
    Minimum viscosity (ML): 0.098 to 2.94 (N)
    Maximum viscosity (MH): 24.5 to 58.8 (N)
    Induction time ($T_{10}$): 1.5 to 5.0 (min)
    Optimum vulcanization time ($T_{90}$): 2.5 to 6.5 (min).
Mold-Processability
    Contamination of a mold die does not occur and processability with a roll is excellent.

Also obtained vulcanized articles have the following physical properties and characteristics. Measuring methods thereof are explained hereinbelow.
[VdF Copolymer]
Mechanical Properties (Physical Properties in Normal State)
    100% modulus (M100): 1.96 to 8.82 (N/mm$^2$)
    Tensile strength at break (Tb): 9.8 to 19.6 (N/mm$^2$)
    Tensile elongation at break (Eb): 150 to 300 (%)
    Hardness (Hs): 60 to 75.
Compression Set (CS)
    After secondary vulcanization in oven: 7 to 12 (%)
    After primary vulcanization by press: 20 to 35 (%).

[VdF Terpolymer]
Mechanic Properties (Physical Properties in Normal State)
  100% modulus (M100): 1.96 to 7.87 (N/mm$^2$)
  Tensile strength at break (Tb): 14.7 to 24.5 (N/mm$^2$)
  Tensile elongation at break (Eb): 200 to 400 (%)
  Hardness (Hs): 65 to 85.
Compression Set (CS)
  After secondary vulcanization in oven: 10 to 17 (%)
  After primary vulcanization by press: 25 to 45 (%).

The vulcanized article of the present invention can be applied on the following molded articles, but the application is not limited to them.

Applications of Molded Articles:

Packing, O-ring, hose, other sealing material, diaphragm and valve having amine resistance, oil resistance, chemical resistance, steam resistance and weather resistance in transportation means such as automotive, ship and airplane; similar packing, O-ring, sealing material, diaphragm, valve, hose, roll and tube in chemical plant; similar packing, O-ring, hose, sealing material, belt, diaphragm, valve, roll and tube in foods plant and foods processing machine (including domestic appliances); similar packing, O-ring, hose, sealing material, diaphragm, valve and tube in nuclear plant; similar packing, O-ring, hose, sealing material, diaphragm, valve, roll, tube, mandrel, cable, flexible joint, belt, rubber plate and weatherstrip in general industrial parts; roll, roll blade and belt for PPC copying machine, etc.

More concretely there are the following applications.

(i) Automotive Applications
① For sealing
  Crank shaft seal
  Gear box seal
  Power piston packing
  Cylinder liner seal
  Valve stem seal
  Front pump seal for automatic transmission
  Rear axle pinion seal
  Gasket for universal joint
  Pinion seal for speed meter
  Piston cup for foot brake
  O-ring and oil seal for torque transmission
  Seal for after-burner for exhaust gas
  Bearing seal
② For hose
  EGR tube
  Twin-carburetor tube
③ For diaphragm
  Diaphragm for sensor of carburetor
④ Other applications
  Vibration proof rubber (engine mount, exhaust system, etc.)
  Hose for after burner.
(ii) Applications in Chemical Industries
① For sealing
  Seals for pump, flow meter and pipe for chemicals
  Seal for heat exchanger
  Packing of glass cooler for sulfuric acid manufacturing equipment
  Seals for sprinkler and transfer pump for agricultural chemicals
  Seal for gas pipe
  Seal for plating solution
  Packing for high temperature vacuum dryer
  Roll seal of belt for paper making
  Seal for fuel battery
  Joint seal for air duct
② For roll
  Roll having trichlene resistance (for dyeing of fiber)
③ Other applications
  Acid resistant hose (for concentrated sulfuric acid)
  Packing for joint of tubes for gas chromatograph and pH meter
  Chlorine gas transfer hose
  Rainwater drain hoses for benzene and toluene reservoir tanks
  Seal, tube, diaphragm and valve parts for analyzer and physical and chemical appliances.
(iii) Applications in Industrial Machinery
① For sealing
  Seals for hydraulic and lubricating machine
  Bearing seal
  Seal for dry copying machine
  Seals for window, etc. of dry cleaner
  Seal for equipment for concentrating uranium hexafluoride
  Seal (vacuum) valve for cyclotron
  Seal for automatic packaging machine
② Other applications
  Rolls, scraper, tube and valve parts for printing equipment
  Rolls, scraper, tube and valve parts for coating equipment
  Ink tube, roll and belt for printer
  Belt and rolls for dry copying machine
  Diaphragms for pumps for analyzing sulfurous acid gas and chlorine gas in the air (environmental pollution-related meters)
  Rolls and belt for printer
  Squeeze rolls for pickling.
(iv) Airplane Applications
  Valve stem seal for jet engine
  Fuel feeding hose, gasket and O-ring
  Rotating shaft seal
  Gasket for hydraulic equipment
  Seal for fire wall.
(v) Ship Applications
  Stern seal for screw propeller shaft
  Suction and exhaust valve stem seals for diesel engine
  Valve seal for butterfly valve
  Stem seal for butterfly valve.
(vi) Food and Medicine Applications
  Seal for plate heat exchanger
  Solenoid valve seal for vending machine
  Plugs for chemicals.
(vii) Electrical Applications
  Insulation oil cap for a train of the Shinkansen line
  Venting seal for liquid ring transmission
  Jacket for oil well cable.

Further the molded article of the present invention can be used for O-ring, sealing material, hose, tube, diaphragm, roll, lining and coating in equipment for producing semiconductor, liquid crystal panel, plasma display panel, plasma address liquid crystal panel, field emission display panel, substrate for solar battery, etc., for example, CVD equipment, etching equipment, oxidation/diffusion equipment, sputtering equipment, ashing equipment, ion implantation equipment, exhausting equipment, and the like which require plasma resistance; O-ring, sealing material, hose, tube, diaphragm and roll in wet etcher, cleaning equipment, pipes for chemicals, gas pipes, and the like which require chemical resistance; and further O-ring, sealing material, hose, tube, diaphragm and roll to be used on parts of the mentioned equipment which are required to be free from dust and metal.

Examples of other applications where chemical resistance is required are O-ring, sealing material, hose, tube, diaphragm of pump and wafer transferring rolls for resist developing solution, releasing solution and wafer cleaning solution in production equipment for semiconductor, liquid crystal panel, plasma display panel, etc.

The present invention is then explained concretely by means of examples, but is not limited thereto.

The methods of measuring the above-mentioned various properties and characteristics which are adopted in the present invention are as mentioned below.

[1] Gelling degree ($F_0/F_1$)

A amount of filtrate during a period of time of one minute from starting of the filtration is measured under the following filtration conditions by using the following filter device.

Device (casing): KST-47 (available from ADVANTEC TOYO KABUSHIKI KAISHA)

Effective filtration area: 47 mm diameter, 12.5 cm$^2$

Kind of filter: PTFE membrane filter (available from ADVANTEC TOYO KABUSHIKI KAISHA)

Opening: 0.1 $\mu$m

Size: 47 mm

Porosity: 68%

Filtration temperature: 25° C.

Filtration pressure: 0.2 kgf/cm$^2$G

Solvent: Acetone

Sample: Pure acetone used as a solvent (Filtrate amount=$F_0$) Acetone solution of 0.2% by weight of a polymer (Filtrate amount=$F_1$).

A filtrate amount (passing amount) of pure acetone during a period of initial one minute per 1 cm$^2$ is 2.7 g/min·cm$^2$ under the above-mentioned conditions.

[2] Weight Average Molecular Weight MW

Device: HLC-8000 (available from TOSO KABUSHIKI KAISHA)

Column: Two columns TSK gel GMH$_{XL}$-H
One column TSK gel G3000H$_{XL}$
One column TSK gel G2000H$_{XL}$ Detector: Differential refraction meter Developing solution: Tetrahydrofuran Temperature: 35° C.

Sample concentration: 0.2% by weight

Standard sample: Various monodisperse polystyrenes ((Mw/Mn)=1.14 (Max)), TSK Standard POLYSTYRENE (available from TOSO KABUSHIKI KAISHA).

[3] Low Molecular Weight Component Having a Molecular Weight of not More than 30,000

Measured in the same manner as in the measurement of the weight average molecular weight of above [2].

[4] Mooney Viscosity (1+10) 100° C.

Measured according to ASTM-D1646 and JIS K6300.

Measuring device: Automatic Mooney viscosity meter available from KABUSHIKI KAISHA UESHIMA SEISAKUSHO Number of rotations of rotor: 2 rpm Measuring temperature: 100° C.

[5] Branching Coefficient (MW$_{LS}$/MW$_{RI}$)

The average molecular weight (MW$_{LS}$) is calculated from a value obtained by measuring with a light scattering photometer equipped with the following GPC-LS device. The average molecular weight (MW$_{RI}$) is calculated from a value obtained by measuring with a differential refraction meter and the same device. The measuring device and measuring conditions are described below.

Device: LS-8000 (available from TOSO KABUSHIKI KAISHA)

Column: TSK guard column H$^{XL}$-H
TSK gel G4000H$_{XL}$
TSK gel G3000H$_{XL}$
TSK gel GMH$_{XL}$-H
(one column each available from TOSO KABUSHIKI KAISHA)

Detector: Light scattering photometer for MW$_{LS}$ (Wavelength of light source 633 nm He—Ne)
Differential refraction meter for MW$_{RI}$ Developing solution: Tetrahydrofuran Temperature: 35° C.

Sample concentration: 5 g/liter

Standard sample: Various monodisperse polystyrenes ((Mw/Mn)=1.14 (Max)), TSK Standard POLYSTYRENE (available from TOSO KABUSHIKI KAISHA).

[6] Weight Reduction Ratio 300 ml of the aqueous dispersion of polymer obtained by the polymerization reaction is continuously poured with stirring over one minute into an aqueous solution of aluminum sulfate (obtained by dissolving 0.1 g of aluminum sulfate in pure water) previously put in a high speed stirring equipment to coagulate and separate the polymer. After removing water, 1,200 ml of clean water is put in, followed by stirring for two minutes to wash the polymer. After repeating the washing operation three times, the polymer is removed and is dried in a hot air recirculation electric oven at 130° C. for 15 hours and then at 150° C. for 3 hours to remove water. After allowing to stand for cooling to room temperature and then allowing to stand for one hour, the weight of the polymer is measured with a 5 g precise balance ($W_0$). Then the polymer is heat-treated for 48 hours in the hot air recirculation electric oven maintained at 250° C. and after allowing to stand for cooling to room temperature and then allowing to stand for one hour, the weight of the polymer is measured with a precise balance ($W_1$).

A value obtained by dividing the weight reduction ($\Delta W$) after the heat treatment by the weight (We) before the heat treatment is the weight reduction ratio (% by weight).

[7] Content of Ionic End Group

Since the ionic end groups are produced by the deterioration of the polymerization initiator, the content of the ionic end groups (Number of ionic groups per 1 kg of polymer=mole/1 kg of polymer) is calculated by the following equation.

$$\text{Content of ionic end groups (mole/1 } kg \text{ of polymer)} = 2 \times f \times I_0 (1 - e^{-kdt})/W \times 10^3$$

in which f: Efficiency of polymerization initiator (assumed to be f=0.5 at 80° C.)

$I_0$: Adding amount of polymerization initiator (mmol)

kd: Constant of deterioration speed (1/min) (assumed to be 0.0057 at 80° C. in case of APS)

t: Polymerization time (min)
W: Weight of obtained polymer (kg).
[8] Vulcanization Characteristics
(Vulcanization Method)

The polymer (elastomer) is subjected to polyol vulcanization in the standard formulation under standard vulcanization conditions.

Standard Formulation

Elastomer; 100 parts by weight

Vulcanizing agent: 2.2 parts by weight of bisphenol AF

Vulcanization aid: 0.4 part by weight of benzyltriphenylphosphonium chloride

Additive: 3 parts by weight of highly active magnesium oxide 20 parts by weight of carbon black (MT-C)

6 parts by weight of calcium hydroxide.

Standard Vulcanization Conditions

Kneading method: Kneading by roll

Vulcanization by press: at 170° C. for 10 minutes

Vulcanization in an oven: at 230° C. for 24 hours.

A vulcanization curve at 170° C. is obtained at the primary vulcanization by press with a JSR Curastometer model II by the above-mentioned vulcanization method and then a minimum viscosity (ML), maximum viscosity (MH), induction time ($T_{10}$) and optimum vulcanization time ($T_{90}$) are obtained.

[9] Stability in Molding

The components of the above-mentioned standard formulation are subjected to press molding at 180° C. for 3 minutes with P-8 mold die for O-ring (for 65 rings). The molding is carried out under the conditions easily causing molding failure, namely under the conditions that a mold-releasing agent is not used and deairing is not carried out.

With respect to O-rings after the molding, the stability in molding is evaluated by the number of O-rings in which there are recognized failure in fusion, generation of voids or contamination of the mold die.

[10] Processability by Roll

The components of the above-mentioned standard formulation are subjected to processing with a kneading roll set at a thickness of 1 mm. The processability at kneading by roll such as roll mixing processability and sheeting is evaluated with naked eyes.

[11] Mechanical Properties

Physical Properties in Normal State

The components of the above-mentioned standard formulation are subjected to primary press vulcanization and secondary oven vulcanization under the above-mentioned standard vulcanization conditions to make a 2 mm thick sheet. 100% modulus (M100), tensile strength at break (Tb) and tensile elongation at break (Eb) are measured according to, JIS-K6251 and a hardness (Hs) is measured according to JIS-K6253.

Compression Set

The components having the above-mentioned standard formulation are subjected to primary press vulcanization and secondary oven vulcanization under the above-mentioned standard vulcanization conditions to make O-ring (P-24). According to JIS-K6301, compression set after the primary press vulcanization and compression set (CS) after the secondary oven vulcanization (Measuring is carried out using a sample subjected to holding at 200° C. for 70 hours under 25% compression and then allowing to stand for 30 minutes in a 25° C. constant temperature chamber) are measured.

PREPARATION EXAMPLE 1

(Preparation of Seed Polymer Particles)

A 1.8 liter polymerization tank equipped with an electromagnetic stirrer as a stirring device was charged with 720 g of pure water, 290 g of an aqueous solution of 10% by weight of ammonium perfluorooctanoate and 0.6 g of diethyl malonate. After the inside of a system was sufficiently replaced with nitrogen gas, the inside pressure was decreased. Those replacing and pressure reducing operations were repeated three times, and 20 g of VdF and 51 g of HFP were introduced under reduced pressure, followed by heating up to 80° C. with stirring. Then 0.6 g of ammonium persulfate (APS) dissolved in 0.02 g of pure water was introduced with pressurized nitrogen gas to initiate the polymerization. The polymerization pressure was 2 MPa. In order to make up for decrease of pressure during the polymerization, a VdF/HFP monomer mixture (78/22% by mole) was supplied continuously. The polymerization was carried out with stirring. Thirty minutes after, the stirring was stopped and the monomers were released to terminate the polymerization.

The weight of the obtained polymer particles was 200 g, and the weight average molecular weight measured by the above-mentioned method was 280,000. The components of the polymer measured according to $^{19}$F-NMR was VdF/HFP=76.6/23.4 (% by mole).

(Preparation of Fluorine-Containing Elastomer)

The same 1.8 liter polymerization tank equipped with a stirrer as above was charged with 950 g of pure water, 18 g of the aqueous dispersion (concentration: 16.6% by weight) of polymer particles prepared above, 4.0 g of diethyl malonate and 14.7 g of an aqueous solution of 10. % by weight of ammonium perfluorooctanoate. After the inside of a system was sufficiently replaced with nitrogen gas, the inside pressure was decreased. Those replacing and pressure reducing operations were repeated three times, and 125 g of VdF and 450 g of HFP were introduced under reduced pressure, followed by heating up to 80° C. with stirring. Then 0.05 g of APS dissolved in 20 g of pure water was introduced with pressurized nitrogen gas to initiate the polymerization. The polymerization was continued under the following conditions and 7 hours after, the stirring was stopped and the monomers were released to terminate the polymerization.

(a) In order to maintain the total content of the monomers in the gas phase at 6 mole/liter, the VdF/HFP (78/22% by mole) monomer mixture was continuously supplied and the pressure in the gas phase was maintained at 6 MPa (absolute pressure).

(b) The stirring speed was maintained at 700 rpm.

When the stirring speed was changed under the polymerization conditions of this Preparation Example, the polymerization rate was constant at the stirring speed of not less than 290 rpm. From this point of view, under the above-mentioned conditions, the monomer content Cp in the polymer was higher than $C_1$.

The weight of the obtained fluorine-containing elastomer was 320 g, and the weight average molecular weight MW measured by the above-mentioned method was 220,000. The components of the polymer measured according to $^{19}$F-NMR was VdF/HFP=77.7/22.3 (% by mole).

Further with respect to this fluorine-containing elastomer, a branching coefficient, a gelling degree, a content of low molecular weight component having a molecular weight of not more than 30,000, a Mooney viscosity, a weight reduction ratio and a content of ionic end groups were measured according to the above-mentioned methods. The results are shown in Table 1.

PREPARATION EXAMPLES 2 TO 6

The fluorine-containing elastomer was prepared in the same manner as in Preparation Example 1 using the polymer particles prepared in Preparation Example 1 except that the amounts of APS and diethyl malonate and the polymerization conditions were changed as shown in Table 1. Properties of the obtained fluorine-containing elastomer are shown in Table 1.

The stirring speeds of each Preparation Example where the polymerization rate became constant were 330 rpm in Preparation Example 2, 400 rpm in Preparation Example 3, 450 rpm in Preparation Example 4, 390 rpm in Preparation Example 5 and 550 rpm in Preparation Example 6. From this point of view, under the polymerization conditions shown in Table 1, any of the monomer contents Cp in the polymer were higher than $C_1$.

COMPARATIVE PREPARATION EXAMPLE 1

The same 1.8 liter polymerization tank equipped with a stirrer as in Preparation Example 1 was charged with 970 g of pure water and 18 g of an aqueous dispersion (concentration: 16.7% by weight) of seed polymer particles prepared above. After the inside of a system was sufficiently replaced with nitrogen gas, the inside pressure was decreased. Those replacing and pressure reducing operations were repeated three times, and 15 g of VdF and 24 g of HFP were introduced under reduced pressure, followed by heating up to 60° C. with stirring. Then 1.7 g of diisopropylperoxydicarbonate (TIP) dissolved in 14.7 g of an aqueous solution of 10% by weight of ammonium perfluorooctanoate was introduced with pressurized nitrogen gas to initiate the polymerization. The polymerization pressure was adjusted to 1.5 MPa. In order to make up for decrease of pressure during the polymerization, the VdF/HFP (78/22% by mole) monomer mixture was continuously supplied, and the polymerization was carried out with stirring (The stirring conditions were the same as in Preparation Example 1). Five hours after, the stirring was stopped and the monomers were released to terminate the polymerization.

The polymerization conditions were as follows.

(a) Total content of the monomers in the gas phase: 0.5 mole/liter (The pressure in the gas phase was maintained at 1.5 MPa (absolute pressure)).

(b) Stirring speed: 400 rpm.

In the polymerization system of Comparative Preparation Example 1, the polymerization rate continued to increase even at the stirring speed of 800 rpm.

The weight of the obtained fluorine-containing elastomer for comparison was 370 g, and the weight average molecular weight MW measured by the above-mentioned method was 220,000. The components of the polymer measured according to $^{19}$F-NMR was VdF/HFP=77.7/22.3 (% by mole).

Further with respect to this fluorine-containing elastomer for comparison, a branching coefficient, a gelling degree, a content of low molecular weight component having a molecular weight of not more than 30,000, a Mooney viscosity, a weight reduction ratio and a content of ionic end groups were measured according to the above-mentioned methods. The results are shown in Table 1.

COMPARATIVE PREPARATION EXAMPLE 2

The same 1.8 liter polymerization tank equipped with a stirrer as in Preparation Example 1 was charged with 950 g of pure water. After the inside of a system was sufficiently replaced with nitrogen gas, the inside pressure was decreased. Those replacing and pressure reducing operations were repeated three times, and 12 g of VdF and 20 g of HFP were introduced under reduced pressure, followed by heating up to 80° C. with stirring. Then 0.064 ml of isopentane was introduced and further 0.6 g of APS dissolved in 10 g of pure water was introduced with pressurized nitrogen gas to initiate the polymerization. The polymerization pressure was adjusted to 1.2 MPa. The introduction of 0.064 ml of isopentane and the introduction of 0.6 g of APS dissolved in 10 g of pure water under pressure were carried out every 50 minutes until the completion of the polymerization. In order to make up for decrease of pressure during the polymerization, the VdF/HFP (78/22% by mole) monomer mixture was continuously supplied, and the polymerization was carried out with stifling (The stirring conditions were the same as in Preparation Example 1). 200 minutes after, the stirring was stopped and the monomers were released to terminate the polymerization.

(a) Total content of the monomers in the gas phase: 0.4 mole/liter (The pressure in the gas phase was maintained at 1.2 MPa (absolute pressure)).

(b) Stirring speed: 400 rpm.

In the polymerization system of Comparative. Preparation Example 2, the polymerization rate continued to increase even at the stirring speed of 800 rpm.

The weight of the obtained fluorine-containing elastomer for comparison was 370 g, and the weight average molecular weight MW measured by the above-mentioned method was 190,000. The components of the polymer measured according to $^{19}$F-NMR was VdF/HFP=78.5/21.5 (% by mole).

Further with respect to this fluorine-containing elastomer for comparison, a branching coefficient, a gelling degree, a content of low molecular weight component having a molecular weight of not more than 30,000, a Mooney viscosity, a weight reduction ratio and a content of ionic end groups were measured according to the above-mentioned methods. The results are shown in Table 1.

TABLE 1

|  | Prep. Ex. 1 | Prep. Ex. 2 | Prep. Ex. 3 | Prep. Ex. 4 | Prep. Ex. 5 | Prep. Ex. 6 | Com. Prep. Ex. 1 | Com. Prep. Ex. 2 |
|---|---|---|---|---|---|---|---|---|
| Polymerization conditions |  |  |  |  |  |  |  |  |
| Charged monomer (% by mole) |  |  |  |  |  |  |  |  |
| VdF | 40 | 40 | 40 | 40 | 40 | 40 | 58 | 60 |
| HFP | 60 | 60 | 60 | 60 | 60 | 60 | 42 | 40 |
| Solvent (g) |  |  |  |  |  |  |  |  |
| Pure water | 950 | 950 | 950 | 950 | 950 | 950 | 970 | 950 |

TABLE 1-continued

|  | Prep. Ex. 1 | Prep. Ex. 2 | Prep. Ex. 3 | Prep. Ex. 4 | Prep. Ex. 5 | Prep. Ex. 6 | Com. Prep. Ex. 1 | Com. Prep. Ex. 2 |
|---|---|---|---|---|---|---|---|---|
| Additive |  |  |  |  |  |  |  |  |
| Diethyl malonate (g) | 4.0 | 4.0 | 4.3 | 3.3 | 6.5 | 2.0 | — | — |
| Isopentane (ml) | — | — | — | — | — | — | — | 0.26 |
| Polymerization initiator (g) |  |  |  |  |  |  |  |  |
| APS | 0.05 | 0.1 | 0.3 | 0.3 | 0.3 | 0.4 | — | 2.1 |
| IIP | — | — | — | — | — | — | 1.7 | — |
| Polymerization temperature (° C.) | 80 | 80 | 80 | 80 | 80 | 80 | 60 | 80 |
| Polymerization time (min) | 420 | 180 | 85 | 60 | 120 | 70 | 300 | 200 |
| Polymerization conditions |  |  |  |  |  |  |  |  |
| Content of monomer in the gas phase (mole/liter) | 6 | 6 | 6 | 6 | 6 | 2.5 | 0.5 | 0.4 |
| Pressure in the gas phase (MPa) | 6 | 6 | 6 | 6 | 6 | 4 | 1.5 | 1.2 |
| Stirring speed (rpm) | 700 | 700 | 700 | 700 | 700 | 800 | 400 | 400 |
| Properties of polymer |  |  |  |  |  |  |  |  |
| Components (% by mole) |  |  |  |  |  |  |  |  |
| VdF | 77.7 | 78.4 | 78.1 | 79.0 | 77.6 | 76.5 | 77.7 | 78.5 |
| HFP | 22.3 | 21.6 | 21.9 | 21.0 | 22.4 | 23.5 | 22.3 | 21.5 |
| Weight average molecular weight MW (×10$^5$) | 2.2 | 2.5 | 2.2 | 3.1 | 1.5 | 2.5 | 2.2 | 1.9 |
| Branching coefficient (MW$_{LS}$/MW$_{RI}$) | 1.14 | 1.25 | 1.13 | 1.18 | 1.09 | 1.12 | 1.48 | 1.52 |
| Gelling degree (F$_0$/F$_1$) | 2.26 | 2.45 | 2.42 | 2.67 | 1.83 | 2.51 | 5.21 | 5.71 |
| Mooney viscosity (1 + 10) 100° C. | 68 | 70 | 64 | 100 | 41 | 74 | 68 | 59 |
| Content of low molecular weight component having a molecular weight of not more than 30,000 which was calculated by equation (IV) (% by weight) | 5.6 | 5.5 | 6.0 | 3.6 | 8.3 | 5.2 | 5.6 | 6.4 |
| Measured content of low molecular weight component having a molecular weight of not more than 30,000 (% by weight) | 4.1 | 4.4 | 4.3 | 2.5 | 6.0 | 5.2 | 6.4 | 6.8 |
| Weight reduction ratio (% by weight) | 0.17 | 0.19 | 0.19 | 0.15 | 0.26 | 0.40 | 0.40 | 0.74 |
| Content of ionic end groups (mole/1 kg of polymer × 10$^{-3}$) | 0.62 | 0.81 | 1.33 | 1.11 | 1.03 | 1.41 | 0.11 | 12.1 |

EXAMPLES 1 TO 6 AND COMPARATIVE EXAMPLES 1 TO 2

Elastomer compositions for vulcanization were prepared using the fluorine-containing elastomers obtained in Preparation Examples 1 to 6 and Comparative Preparation Examples 1 to 2, respectively with the above-mentioned standard formulation, and vulcanizability, stability in molding and processability by roll of the compositions were evaluated by the above-mentioned methods. Further vulcanizability, physical properties in normal state and compression set of vulcanized articles were evaluated by the above-mentioned methods. The results are shown in Table 2.

TABLE 2

|  | Ex. 1 | Ex. 2 | Ex. 3 | Ex. 4 | Ex. 5 | Ex. 6 | Com. Ex. 1 | Com. Ex. 2 |
|---|---|---|---|---|---|---|---|---|
| Vulcanizability (170° C.) |  |  |  |  |  |  |  |  |
| ML (kgf) | 0.13 | 0.12 | 0.11 | 0.16 | 0.05 | 0.23 | 0.18 | 0.18 |
| MH (kgf) | 5.20 | 4.50 | 4.60 | 5.30 | 2.80 | 5.00 | 4.60 | 4.10 |
| T$_{10}$ (min) | 2.00 | 2.00 | 2.50 | 2.40 | 2.80 | 3.00 | 2.10 | 4.30 |
| T$_{90}$ (min) | 2.50 | 2.80 | 3.00 | 3.10 | 3.40 | 4.10 | 2.80 | 6.10 |
| Stability in molding | 1 | 1 | 2 | 1 | 2 | 3 | 5 | 11 |
| Processability by roll | ○ | ○ | ○ | ○ | ○ | ○ | Δ | ○ |
| Physical properties in normal state |  |  |  |  |  |  |  |  |
| M100 (N/mm$^2$) | 5.3 | 4.8 | 5.1 | 5.3 | 5.5 | 4.4 | 4.7 | 5.1 |
| Tb (N/mm$^2$) | 14.4 | 14.7 | 14.9 | 14.0 | 15.8 | 15.6 | 14.1 | 13.9 |
| Eb (%) | 230 | 230 | 230 | 210 | 230 | 258 | 240 | 200 |
| Hs (JIS) | 69 | 69 | 68 | 69 | 70 | 70 | 70 | 69 |
| Compression set (CS) (%) |  |  |  |  |  |  |  |  |
| After primary press vulcanization | — | 26 | 27 | — | — | — | 47 | 32 |
| After secondary oven vulcanization | 10 | 10 | 9 | 8 | 12 | 9 | 13 | 11 |

PREPARATION EXAMPLES 7 TO 9

Fluorine-containing elastomers were prepared in the same manner as in Preparation Example 1 using the polymer particles prepared in Preparation Example 1 except that the polymerization temperature, adding method and kind of the molecular weight controller, etc. were changed as shown in Table 3. Properties of the obtained fluorine-containing elastomers are shown in Table 3.

The stirring speeds of each Preparation Example where the polymerization rate became constant were 500 rpm in Preparation Example 7, 450 rpm in Preparation Example 8 and 400 rpm in Preparation Example 9. From this point of view, under the polymerization conditions shown in Table 3, any of the monomer contents Cp in the polymer were higher than $C_1$.

TABLE 3

|  | Prep. Ex. 7 | Prep. Ex. 8 | Prep Ex. 9 |
|---|---|---|---|
| Polymerization conditions |  |  |  |
| Charged monomer (% by mole) |  |  |  |
| VdF | 42 | 41 | 42 |
| HFP | 58 | 59 | 58 |
| Solvent (g) |  |  |  |
| Pure water | 960 | 960 | 960 |
| Additive |  |  |  |
| Diethyl malonate (g) | 3.0 | 0.3 g was added initially and 12 g was added when an amount of the obtained polymer reached 150 g. | — |
| Isopentane (ml) | — | — | 1.84 |
| Polymerization initiator (g) APS | 0.3 | 0.1 | 0.3 |
| Polymerization temperature (° C.) | 70 | 80 | 80 |
| Polymerization time (min) | 180 | 166 | 220 |
| Polymerization conditions |  |  |  |
| Content of monomer in the gas phase (mole/liter) | 6 | 6 | 6 |
| Pressure in the gas phase (MPa) | 4.6 | 6 | 6 |
| Stirring speed (rpm) | 700 | 700 | 700 |
| Properties of polymer |  |  |  |
| Components (% by mole) |  |  |  |
| VdF | 78.0 | 77.8 | 79.0 |
| HFP | 22.0 | 22.2 | 21.0 |
| Weight average molecular weight MW ($\times 10^5$) | 2.8 | 4.0 | 2.2 |
| Branching coefficient ($MW_{LS}/MW_{RI}$) | 1.20 | 1.8 | 1.15 |
| Gelling degree ($F_0/F_1$) | 2.18 | 2.3 | 2.15 |
| Mooney viscosity (1 + 10) 100° C. | 101 | 66 | 65 |
| Content of low molecular weight component having a molecular weight of not more than 30,000 which was calculated by equation (IV) (% by weight) | 3.5 | 5.8 | 5.9 |
| Measured content of low molecular weight component having a molecular weight of not more than 30,000 (% by weight) | 3.0 | 5.6 | 3.9 |
| Weight reduction ratio (% by weight) | 0.21 | 0.22 | 0.11 |
| Content of ionic end groups (mole/1 kg of polymer $\times 10^{-3}$) | 2.2 | 0.7 | 2.5 |

EXAMPLES 7 TO 9

Elastomer compositions for vulcanization were prepared using the fluorine-containing elastomers obtained in Preparation Examples 7 to 9, respectively with the above-mentioned standard formulation, and vulcanizability, stability in molding and processability by roll of the compositions were evaluated by the above-mentioned methods. Further vulcanizability, physical properties in normal state and compression set of vulcanized articles were evaluated by the above-mentioned methods. The results are shown in Table 4.

TABLE 4

|  | Ex. 7 | Ex. 8 | Ex. 9 |
|---|---|---|---|
| Vulcanizability (170° C.) |  |  |  |
| ML (kgf) | 0.22 | 0.23 | 0.14 |
| MH (kgf) | 5.03 | 4.6 | 4.72 |
| $T_{10}$ (min) | 2.1 | 2.3 | 2.5 |
| $T_{90}$ (min) | 3.0 | 3.3 | 3.0 |
| Stability in molding | 3 | 2 | 5 |
| Processability by roll | ○ | ○ | ○ |
| Physical properties in normal state |  |  |  |
| M100 (N/mm$^2$) | 4.8 | 4.5 | 5.3 |
| Tb (N/mm$^2$) | 14.7 | 12.5 | 14.2 |
| Eb (%) | 240 | 225 | 210 |
| Hs (JIS) | 71 | 69 | 69 |
| Compression set (CS) (%) |  |  |  |
| After primary press vulcanization | 28 | 29 | 27 |
| After secondary oven vulcanization | 9.2 | 10.2 | 9.0 |

INDUSTRIAL APPLICABILITY

According to the present invention, a vulcanized article having a small compression set can be produced in a short period of time and a vulcanizable fluorine-containing elastomer composition having excellent stability in molding and kneading property can be provided. The vulcanized article is suitable particularly as a sealing material.

The present invention can also provide a fluorine-containing elastomer in which branched chains and gelled portion are reduced and a content of a low molecular weight component is small.

What is claimed is:

1. A fluorine-containing elastomer which comprises vinylidene fluoride unit and hexafluoropropylene unit and is characterized in that:
    (1) when a 0.2% by weight acetone solution of the fluorine-containing elastomer is subjected to pressurized filtration under a condition where acetone passes through at a flow rate $F_0$ of 2.4 g/min·cm$^2$, a ratio $F_0/F_1$ is from 1.2 to 3.5, provided that $F_1$ is an amount of filtrate of the acetone solution during initial one minute, and
    (2) a weight average molecular weight MW measured by GPC is from 50,000 to 600,000.

2. The fluorine-containing elastomer of claim 1, wherein (3) a ratio of $MW_{LS}/MW_{RI}$ of an average molecular weight $MW_{LS}$ measured by GPC-LALLS to $MW_{RI}$ measured by GPC-RI is from 1 to 2.5.

3. The fluorine-containing elastomer of claim 1, wherein said ratio $F_0/F_1$ of the fluorine-containing elastomer is from 1.2 to 3.0.

4. A fluorine-containing elastomer which comprises vinylidene fluoride unit and hexafluoropropylene unit and is characterized in that a weight average molecular weight MW measured by GPC is from 50,000 to 600,000, and when the elastomer is vulcanized in a standard formulation under standard vulcanization conditions, an optimum vulcanization time $T_{90}$ (min) and a compression set CS (%) satisfy the following equations (I) and (II):

Equation (I): in case of $50{,}000 \leq MW \leq 200{,}000$, $$CS \leq -3.45\ \mathrm{Ln}(T_{90}) + 22.8 - 4 \times 10^{-5} \times MW$$

Equation (II): in case of $200{,}000 < MW$, $$CS \leq -3.45\ \mathrm{Ln}(T_{90}) + 14.8.$$

5. The fluorine-containing elastomer of claim 1, wherein the elastomer satisfies the following equation (IV):

$$Y < -5.3\ \mathrm{Ln}(X) + 28,$$

provided that X is a Mooney viscosity (1+10) at 100° C. of the fluorine-containing elastomer and Y is a percent by weight of a low molecular weight component having a weight average molecular weight measured by GPC of not more than 30,000 in the fluorine-containing elastomer.

6. The fluorine-containing elastomer of claim 1, wherein a weight reduction ratio of the elastomer when heated at 250° C. for 48 hours is not more than 1% by weight.

7. The fluorine-containing elastomer of claim 1, which contains ionic end groups in an amount of from $10^{-5}$ to $10^{-2}$ mole per 1 kg of the elastomer.

8. The fluorine-containing elastomer of claim 1, which comprises 50 to 90% by mole of the vinylidene fluoride unit and 50 to 10% by mole of the hexafluoropropylene unit.

9. A vulcanizable fluorine-containing elastomer composition which comprises a vulcanization agent, a vulcanization aid and a fluorine-containing elastomer having C—H bond in its polymer chain and characterized in that:

(1) when a 0.2% by weight acetone solution of the fluorine-containing elastomer is subjected to pressurized filtration under a condition where acetone passes through at a flow rate $F_0$ of 2.4 g/min·cm², a ratio $F_0/F_1$ is from 1.2 to 3.5, provided that $F_1$ is an amount of filtrate of the acetone solution during initial one minute, and (2) a weight average molecular weight MW measured by GPC is from 50,000 to 600,000.

10. The fluorine-containing elastomer composition of claim 9, wherein the fluorine-containing elastomer is characterized in that:

(3) a ratio of $MW_{LS}/MW_{RI}$ of an average molecular weight $MW_{LS}$ measured by GPC-LALLS, to $MW_{RI}$ measured by GPC-RI is from 1 to 2.5.

11. A vulcanizable fluorine-containing elastomer composition which comprises a vulcanization agent, a vulcanization aid and a fluorine-containing elastomer having C—H bond in its polymer chain and characterized in that a weight average molecular weight MW measured by GPC of the elastomer is from 50,000 to 600,000 and when the elastomer is vulcanized in a standard formulation under standard vulcanization conditions, an optimum vulcanization time $T_{90}$ (min) and a compression set CS (%) of the elastomer satisfy the following equations (I) and (I):

Equation (I): in case of $50{,}000 \leq MW \leq 200{,}000$, $$CS \leq -3.45\ \mathrm{Ln}(T_{90}) + 22.8 - 4 \times 10^5 \times MW$$

Equation (II): in case of $200{,}000 < MW$, $$CS \leq -3.45\ \mathrm{Ln}(T_{90}) + 14.8.$$

12. A vulcanizable fluorine-containing elastomer composition comprising a vulcanization agent, a vulcanization aid and a fluorine-containing elastomer having C—H bond in its polymer chain, wherein an optimum vulcanization time $T_{90}$ (min) of the composition and a compression set CS (%) of a vulcanized article satisfy the following equations (I) and (II):

Equation (I): in case of $50{,}000 \leq MW \leq 200{,}000$, $$CS \leq -3.45\ \mathrm{LN}(T_{90}) + 22.8 - 4 \times 10^5 \times MW$$

Equation (II): in case of $20{,}000 < MW$, $$CS \leq -3.45\ \mathrm{LN}(T_{90}) + 14.8.$$

13. The composition of claim 9, wherein said fluorine-containing elastomer is a copolymer of vinylidene fluoride and other monomer.

14. The composition of claim 13, wherein said other monomer is at least one selected from the group consisting of hexafluoropropylene, tetrafluoroethylene and perfluoro (alkyl vinyl ether).

15. The composition of claim 9, wherein said vulcanization agent is at least one selected from the group consisting of polyhydroxy compounds, polyamine compounds and organic peroxides.

16. The composition of claim 15, wherein said polyhydroxy compound is at least one selected from the group consisting of bisphenol AF, hydroquinone, bisphenol A and diaminobisphenol AF.

17. The composition of claim 15, wherein said organic peroxide is at least one selected from the group consisting of α,α'-bis(t-butylperoxy)diisopropylbenzene, 2,5-dimethyl-2,5-di(t-butylperoxy)hexane and dicumyl peroxide.

18. The composition of claim 15, wherein said polyamine compound is hexamethylenediamine carbamate and/or N,N'-dicinnamylidene-1,6-hexamethylenediamine.

19. The composition of claim 9, wherein said vulcanization aid is at least one organic base residue selected from the group consisting of quaternary ammonium salts, quaternary phosphonium salts, cyclic amines and mono-functional amine compounds.

20. A vulcanized article obtained by vulcanizing the fluorine-containing elastomer composition of claim 9.

21. A process for preparing a fluorine-containing elastomer having C—H bond in its polymer chain by emulsion-polymerizing polymerizable monomers in an aqueous medium in a reactor, in which the polymerization is carried out under the conditions that:

(a) a reaction system in the reactor comprises a gas phase and a liquid phase, and (b) during the polymerization reaction, a content Cp of the polymerizable monomers in the polymer particles which are in the process of polymerization reaction is maintained at a reference content $C_1$ or more of the polymerizable monomers in the polymer particles.

22. The preparation process of claim 21, wherein the content Cp of the polymerizable monomers in the polymer particles which are in the process of polymerization reaction is maintained at a reference content $C_2$ or more of the polymerizable monomers in the polymer particles.

23. The preparation process of claim 21, wherein the polymerizable monomers are supplied into the reactor continuously or batchwise.

24. The preparation process of claim 21, wherein a water soluble radical polymerization initiator is used.

25. The preparation process of claim 21, wherein the polymerizable monomers are vinylidene fluoride and other monomer.

26. The preparation process of claim 25, wherein said other monomer is at least one selected from the group consisting of hexafluoropropylene, tetrafluoroethylene and perfluoro(alkyl vinyl ether).

27. The fluorine-containing elastomer of claim 4, wherein the elastomer satisfies the following equation (IV):

$$Y \leq -5.3 \operatorname{Ln}(X) + 28,$$

provided that X is a Mooney viscosity (1+10) at 100° C. of the fluorine-containing elastomer and Y is a percent by weight of a low molecular weight component having a weight average molecular weight measured by GPC of not more than 30,000 in the fluorine-containing elastomer.

28. The fluorine-containing elastomer of claim 4, wherein a weight reduction ratio of the elastomer when heated at 250° C. for 48 hours is not more than 1% by weight.

29. The fluorine-containing elastomer of claim 4, which contains ionic end groups in an amount of from $10^{-5}$ to $10^{-2}$ mole per 1 kg of the elastomer.

30. The fluorine-containing elastomer of claim 4, which comprises 50 to 90% by mole of the vinylidene fluoride unit and 50 to 10% by mole of the hexafluoropropylene unit.

31. The composition of claim 11, wherein said fluorine-containing elastomer is a copolymer of vinylidene fluoride and other monomer.

32. The composition of claim 31, wherein said other monomer is at least one selected from the group consisting of hexafluoropropylene, tetrafluoroethylene and perfluoro (alkyl vinyl ether).

33. The composition of claim 11, wherein said vulcanization agent is at least one selected from the group consisting of polyhydroxy compounds, polyamine compounds and organic peroxides.

34. The composition of claim 33, wherein said polyhydroxy compound is at least one selected from the group consisting of bisphenol AF, hydroquinone, bisphenol A and diaminobisphenol AF.

35. The composition of claim 33, wherein said organic peroxide is at least one selected from the group consisting of α,α'-bis(t-butylperoxy)diisopropylbenzene, 2,5-dimethyl-2,5-di(t-butylperoxy)hexane and dicumyl peroxide.

36. The composition of claim 33, wherein said polyamine compound is hexamethylenediamine carbamate and/or N,N'-dicinnamylidene-1,6-hexamethylenediamine.

37. The composition of claim 11, wherein said vulcanization aid is at least one organic base residue selected from the group consisting of quaternary ammonium salts, quaternary phosphonium salts, cyclic amines and mono-functional amine compounds.

38. A vulcanized article obtained by vulcanizing the fluorine-containing elastomer composition of claim 11.

39. The composition of claim 12, wherein said fluorine-containing elastomer is a copolymer of vinylidene fluoride and other monomer.

40. The composition of claim 39, wherein said other monomer is at least one selected from the group consisting of hexafluoropropylene, tetrafluoroethylene and perfluoro (alkyl vinyl ether).

41. The composition of claim 12, wherein said vulcanization agent is at least one selected from the group consisting of polyhydroxy compounds, polyamine compounds and organic peroxides.

42. The composition of claim 41, wherein said polyhydroxy compound is at least one selected from the group consisting of bisphenol AF, hydroquinone, bisphenol A and diaminobisphenol AF.

43. The composition of claim 41, wherein said organic peroxide is at least one selected from the group consisting of α,α'-bis(t-butylperoxy)diisopropylbenzene, 2,5-dimethyl-2,5-di(t-butylperoxy)hexane and dicumyl peroxide.

44. The composition of claim 41, wherein said polyamine compound is hexamethylenediamine carbamate and/or N,N'-dicinnamylidene-1,6-hexamethylenediamine.

45. The composition of claim 12, wherein said vulcanization aid is at least one organic base residue selected from the group consisting of quaternary ammonium salts, quaternary phosphonium salts, cyclic amines and mono-functional amine compounds.

46. A vulcanized article obtained by vulcanizing the fluorine-containing elastomer composition of claim 12.

* * * * *